(12) United States Patent
Baker et al.

(10) Patent No.: US 8,088,516 B2
(45) Date of Patent: Jan. 3, 2012

(54) STORAGE BATTERY ELECTRODES WITH INTEGRAL CONDUCTORS

(75) Inventors: Christopher A. Baker, Tempe, AZ (US); John E. Gleason, Gilbert, AZ (US); Anthony Maurizo, Phoenix, AZ (US)

(73) Assignee: Acme Aerospace, Inc., Butler, WI (US)

( * ) Notice: Subject to any disclaimer, the term of this patent is extended or adjusted under 35 U.S.C. 154(b) by 1426 days.

(21) Appl. No.: 11/282,537

(22) Filed: Nov. 18, 2005

(65) Prior Publication Data

US 2007/0117020 A1    May 24, 2007

(51) Int. Cl.
 *H01M 4/70* (2006.01)
(52) U.S. Cl. ......... 429/242; 429/233; 429/234; 429/211
(58) Field of Classification Search ......... None
See application file for complete search history.

(56) References Cited

U.S. PATENT DOCUMENTS

| | | | |
|---|---|---|---|
| 3,668,081 A | 6/1972 | Borner | |
| 3,702,019 A | 11/1972 | Pollack | |
| 3,835,514 A | 9/1974 | Pollack | |
| 4,098,966 A * | 7/1978 | Brown | 429/161 |
| 4,379,410 A | 4/1983 | Fritts et al. | |
| 4,439,465 A | 3/1984 | Reid et al. | |
| 4,447,509 A | 5/1984 | Maskalick | |
| 5,158,842 A | 10/1992 | McHenry | |
| 5,290,640 A | 3/1994 | Tsenter et al. | |
| 5,364,713 A * | 11/1994 | Von Benda et al. | 429/66 |
| 6,399,253 B1 * | 6/2002 | Chang et al. | 429/233 |
| 7,291,186 B2 * | 11/2007 | Zhang | 29/623.1 |
| 2004/0003993 A1 | 1/2004 | Weres et al. | |

FOREIGN PATENT DOCUMENTS

| | | |
|---|---|---|
| JP | 61 214363 | 9/1986 |
| JP | 07 153468 | 6/1995 |
| JP | 11 144739 | 5/1999 |

* cited by examiner

*Primary Examiner* — Cynthia Lee
(74) *Attorney, Agent, or Firm* — Quarles & Brady LLP; George E. Haas

(57) ABSTRACT

A battery cell has a plurality of first and second electrodes of opposite polarities that are interleaved. Each of the first and second electrodes is a sheet of non-woven fabric having a first edge from which a tab projects, and a second edge transverse to and substantially longer than the first edge. The non-woven fabric is coated with a metal in a manner that forms a strip along the second edge which has a greater electrical conductivity than areas more remote from the second edge. The strip extends along the tab. A first terminal is electrically connected to the strip along the tabs of the first electrodes, and a second terminal is electrically connected to the strip along the tabs of the second electrodes.

14 Claims, 1 Drawing Sheet

STORAGE BATTERY ELECTRODES WITH INTEGRAL CONDUCTORS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to the structure of electrochemical storage batteries, and more particularly, to a novel and improved electrode plate for such batteries.

2. Description of the Related Art

Typically, storage batteries of the electrochemical type have one or more cells which include a plurality of first electrodes of one polarity interleaved in a spaced apart manner with a plurality of second electrodes of the opposite polarity. Separate terminals interconnect the electrodes of each polarity, usually to a terminal post, so that two terminals of opposite polarity are provided for each cell.

U.S. Pat. No. 5,158,842 discloses the basic structure of a storage battery having a plurality of interleaved electrode plates of opposite polarities. Each of the plates has a generally rectangular main section that forms an active region of the electrode with a tab projecting outward from one corner of the main section. The tabs of the electrode plates of one polarity are aligned along one side of the battery, while the tabs on the opposite polarity plates are aligned on the other side of the battery. The respective tabs of the plates of the same polarity are electrically connected, such as by welding, to the body of a terminal that has a connection post.

One type of electrode plate comprised a flexible fiber plaque that was suitable for active material loaded electrodes, such as used in nickel-cadmium and nickel-iron battery systems. A common fibrous plaque was made of compacted, intermingled fine fibers reactively diffused with nickel by conventional plating processes. Prior batteries had plaques that often were formed by conductive fibers, such as iron wool, however non-conductive fibers also were used. The fibers were randomly oriented in the length, width and thickness directions of the plaque and are diffusion bonded with nickel at their contact points. The resultant electrode had pores into which the active material of the battery was introduced during subsequent assembly steps.

As shown in FIG. 1, a typical previous electrode 10 was rectangular—having one edge that was significantly greater than another orthogonal edge. The electrode 10 has a sheet-like body 11 comprising a main, or active, region 12 and a tab 16. The main region 12 had a uniform electrical conductivity. The tab 16 projected from the longer edge of the main section 12 and due to the electroplating process that tab had a portion 14 with greater density of metal. That portion 14 enabled a metal contact tab 18 to be welded to the electrode body 11. In the final battery, a battery terminal was welded or otherwise electrically connected to the contact tabs 18 of the electrodes 10 of the same polarity, thereby connecting those electrodes together.

Certain battery installations dictated that the terminals be placed along the shorter edge of the electrode with the edge extending perpendicularly there from having a significantly greater length. However, it was discovered that in this orientation the effective resistance in the portion of the electrode remote from the tab was significantly greater than the portion of the electrode adjacent the tab. Thus, the more distant portion of the electrode was less effective than the portion closer to the tab.

SUMMARY OF THE INVENTION

The present invention provides a novel and improved battery cell and electrodes for that cell.

The battery cell is formed by a plurality of first electrodes of one polarity interleaved with a plurality of second electrodes of an opposite polarity. Each of the first and second electrodes comprises a sheet of non-woven fabric having a first edge from which a portion of the non-woven fabric projects forming a tab, and having a second edge that is transverse to and preferably substantially longer than the first edge. The non-woven fabric has metal deposited thereon in a manner that forms a strip along the second edge which has a greater electrical conductivity than metal plated areas of the sheet that are remote from the second edge. This strip continues to extend along the tab.

A first terminal is attached to the tabs of the first electrodes in electrical contact with the strip along each tab. A second terminal is attached in electrical contact with the strip along the tabs on the second electrodes.

In a preferred embodiment, the non-woven fabric is a needle punched felt made of polypropylene fibers. The needle punched felt is coated with the metal. Preferably, the non-woven fabric is electroplated with the metal, wherein a greater density of the metal is deposited along the second edge.

DETAILED DESCRIPTION OF THE INVENTION

Figure 1:
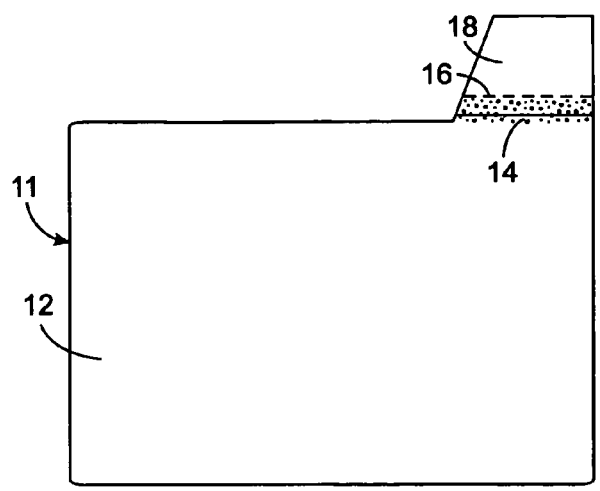
FIG. 1 is a plane view of an electrode plate from a previous battery.
Figure 2:
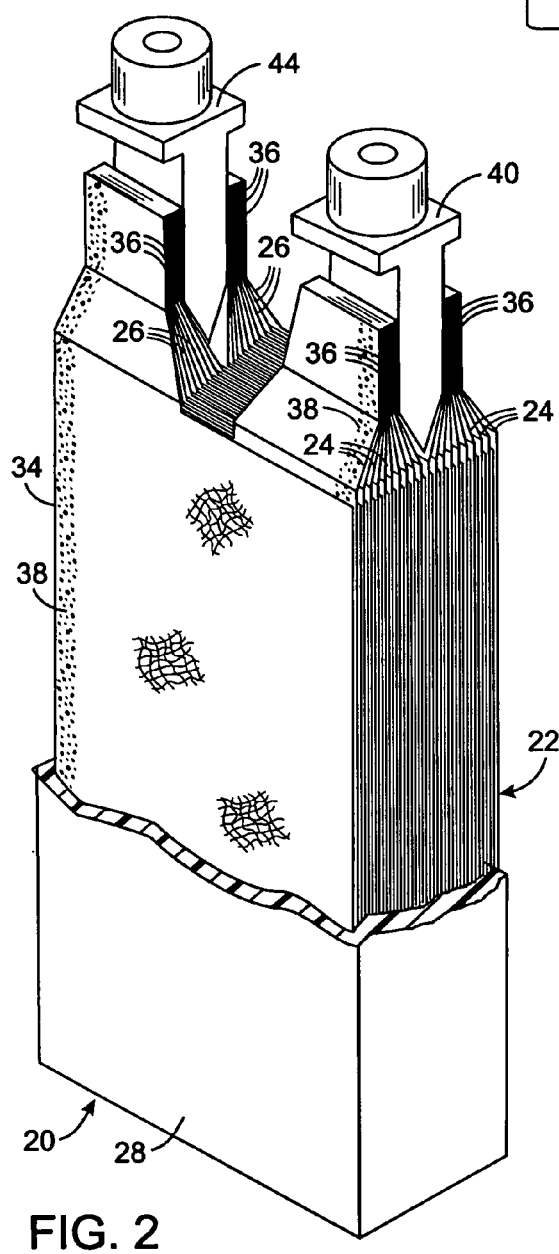
FIG. 2 is a cutaway perspective view of a battery containing unique electrodes according to the present invention.

With initial reference to FIG. 2, a battery 20 according to the present invention has a single cell 22, however it should be understood that the present concepts can be utilized in multiple cell batteries. The battery cell 22 comprises a plurality of interleaved first and second electrodes 24 and 26 contained within a housing 28. The first and second electrodes 24 and 26 have opposite electrical polarities and the number of them varies as is necessary to provide the desired capacity of the battery 20. The electrodes 24 and 26 are interleaved in a parallel, spaced apart configuration. An active material of the battery is placed into the pores of the electrodes.

Figure 3:
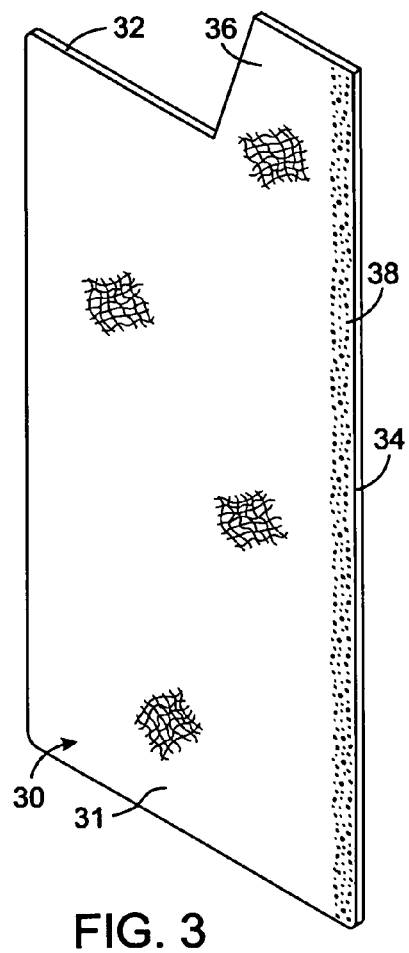
FIG. 3 is a perspective view of one of those electrodes.

When referenced to FIG. 3 each of the first and second electrodes 24 and 26 is formed from a sheet of a non-woven material, such as needle punched felt made of polypropylene fibers. Needle punched fabrics are well known for a variety of uses and are made by initially carding selected fibers into a web which then is layered up to a desired required thickness. The resultant web is passed through a needle bed that comprises thousands of barbed needles set in a plate which goes up and down with respect to the web. That action pushes the needles through the fibers which has the effect of entangling the fibers. The web then is calendered to achieve the final thickness.

Fabrication of both types of electrodes 24 and 26 from the non-woven web material initially involves electroless plating the material with metal, such as nickel, which results in relatively thin metal coating on the web fibers. With a conductive coating on the fibers, the material then is electroplated to increase the thickness of the metal. For example, the needle punched felt web can be provided in a long roll from which numerous individual electrodes 24 and 26 are later cut. After the electroless plating, the web material is unwound from the roll and fed through an electroplating apparatus. The electroplating provides a rather uniformly dense metal coating on the major portion of the web, however the metal coating along the edges has a greater density than elsewhere. Therefore, the edge regions have a higher electrical conductivity.

The metal coated felt material then is impregnated with a metal consistent with the type of battery in which the electrode will be used. In a nickel-cadmium battery system, for example, cadmium is embedded into the pores of a felt web for the negative, first electrodes 24; and additional nickel is embedded in the pores of another felt web for the positive, second electrodes 26. However, a skilled artisan will recognize that different metals are employed to form other types of batteries.

After the metal has been deposited on the non-woven felt, individual electrodes are punched or otherwise cut from the material. This process produces an electrode having a large porous surface area. With continuing reference to FIG. 3, each electrode 30 thereby comprises a generally rectangular sheet 31 of the non-woven, metal plated material, however a sheet of another shape may be created. The sheet 31 has a first edge 32 extending along its narrower dimension and has a longer second edge 34 perpendicular to the first edge 32. A tab 36 projects outwardly from the first edge 32 at a corner where the first and second edges would otherwise intersect and the second edge 34 continues to extend along the tab. In forming the individual electrodes 30 from the larger body that was electroplated, the region with the greater density metal coated fibers forms a strip 38 along the second edge 34 of the electrode sheet 31. That strip 38 extends the entire length along the second edge including the tab 36. This strip 38 acts as a conductor linking the tab 36 to the active remote regions of the electrode thereby providing better utilization of the active material over the entire surface area of the electrode.

This process produces a plurality of the first and second electrodes 24 and 26 that then are assembled into the battery cell 22 by interleaving the two types of electrodes as seen in FIG. 2. In this assembly, the tabs 36 of the first electrodes 24 oriented along one side while the tabs 36 on the second electrodes 26 are oriented along the opposite side. A negative, first electrical terminal 40 is inserted between two adjacent first electrodes 24 in the middle of the electrode assembly, and the tabs 36 of first electrodes 24 are bent inward against each other and against opposite side surfaces of a first electrical terminal 40. Therefore, the upper sections of the tabs 36 on adjacent first electrodes are abutting and one tab on each side abuts the first electrical terminal 40. While being held in this position those tabs 36 are welded to one another and to the first terminal 40. Specifically the more densely metalized strip 38 on each tab provides a surface for welding to the terminal. A positive, second electrical terminal 42 is connected to the tabs 36 on the second electrodes 26 in the same manner as described with respect to the first terminal 40. Other techniques for electrically connecting the tabs 36 of the two electrodes 24 and 26 to the respective terminal 40 or 42, such as brazing or mechanical fastening by a bolt for example, can be employed.

The sub-assembly of the plurality of first and second electrodes 24 and 26 and the two terminals 40 and 42 then is placed into the housing 28, which is sealed so that only the upper portion of each terminal projects through the housing.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A battery cell comprising:
   first electrodes of one polarity;
   second electrodes of opposite polarity interleaved with the first electrodes;
   wherein each of the first and second electrodes comprises a sheet of a non-woven fabric having a first edge from which a portion of the non-woven fabric projects forming a tab, and a second edge transverse to the first edge, the non-woven fabric is plated with the metal, wherein a greater density of the metal is deposited along the second edge so as to form a strip along the second edge which has a greater electrical conductivity and a greater weight per unit of surface area than metal coated areas of the sheet more remote from the second edge, the strip extending along the tab;
   a first terminal attached to each tab of the first electrodes and electrically connected to the strip along that tab; and
   a second terminal attached to each tab of the second electrodes and electrically connected to the strip along the tab of the second electrodes.

2. The battery cell as recited in claim 1 wherein the second edge of each of the first and second electrodes is substantially longer than the first edge.

3. The battery cell as recited in claim 1 wherein the non-woven fabric comprises polypropylene fibers.

4. The battery cell as recited in claim 1 wherein the non-woven fabric comprises a needle punched material.

5. The battery cell as recited in claim 1 further comprising a first weld electrically connecting the strip along the tab of each first electrode to the first terminal, and a second weld electrically connecting the strip along the tab of each second electrode to the second terminal.

6. The battery cell as recited in claim 1 wherein tabs of adjacent first electrodes abut each other and at least one of those tabs abuts the first terminal.

7. The battery cell as recited in claim 6 wherein the tabs of the first electrodes are held together and to the first terminal by at least one of a weld joint, a braze joint, and a mechanical fastener.

8. The battery cell as recited in claim 1 wherein the first terminal is located between two of the tabs on the first electrodes, and the tabs of adjacent first electrodes on one side of the first terminal abut each other and at least one of those tabs abuts a surface of the first terminal, and other tabs of adjacent first electrodes on another side of the first terminal abut each other and at least one of those other tabs abuts another surface of the first terminal 9. The battery cell as recited in claim 1 wherein tabs of adjacent first electrodes abut each other and at least one of those tabs abuts the first terminal; and tabs of adjacent second electrodes abut each other and at least one of those tabs on the second electrodes abuts the second terminal.

10. The battery cell as recited in claim 9 wherein the tabs of the first electrodes are held together and to the first terminal by at least one of a weld joint, a braze joint, and a mechanical fastener; and the tabs of the second electrodes are held together and to the second terminal by at least one of a weld joint, a braze joint, and a mechanical fastener.

11. The battery cell as recited in claim 1 wherein:
the first terminal is located between two of the tabs on the first electrodes, and tabs of adjacent first electrodes on one side of the first terminal abut each other and at least one of those tabs abuts a surface of the first terminal, and other tabs of adjacent first electrodes on another side of the first terminal abut each other and at least one of those other tabs abuts another surface of the first terminal; and
the second terminal is located between two of the tabs of the second electrodes, and the tabs of adjacent second electrodes on one side of the second terminal abut each other and at least one of those tabs abuts a surface of the second terminal, and other tabs of adjacent second electrodes on another side of the second terminal abut each other and at least one of those other second electrode tabs abuts another surface of the second terminal.

12. An electrode for a battery cell, said electrode comprising a sheet of non-woven fabric having a first edge from which a portion of the non-woven fabric projects forming a tab, and a second edge transverse to and substantially longer than the first edge, the non-woven fabric being plated with the metal, wherein a greater density of the metal is deposited in the strip along the second edge so as to form a strip that extends along the second edge and that has a greater electrical conductivity and a greater weight per unit of surface area than metal coated areas of the sheet more remote from the second edge, the strip extending along the tab.

13. The electrode as recited in claim 12 wherein the non-woven fabric comprises polypropylene fibers.

14. The electrode as recited in claim 12 wherein the non-woven fabric comprises a needle punched material.

\* \* \* \* \*